United States Patent [19]

Hashizume et al.

[11] 4,299,748

[45] Nov. 10, 1981

[54] AQUEOUS COATING COMPOSITIONS CONTAINING ELECTROCONDUCTIVE COPOLYMER

[75] Inventors: Yoshio Hashizume; Masanori Itoh, both of Saitama; Yasumasa Sakai, Amagasaki; Akiyosi Kamita, Himeji, all of Japan

[73] Assignee: Daicel Ltd., Sakai, Japan

[21] Appl. No.: 969,373

[22] Filed: Dec. 14, 1978

[30] Foreign Application Priority Data

Dec. 20, 1977 [JP] Japan .................................. 52/154123

[51] Int. Cl.³ ........................ C08L 33/02; C08L 41/00
[52] U.S. Cl. ............................ 260/29.6 RW; 428/500; 260/17 R; 260/28.5 R; 260/29.6 WB; 260/29.6 HN; 260/29.6 SQ; 260/29.6 WA; 525/212; 525/217; 525/221
[58] Field of Search ............. 260/29.6 RW, 29.6 WB, 260/29.6 HN, 29.6 SQ

[56] References Cited

U.S. PATENT DOCUMENTS

| | | | |
|---|---|---|---|
| 3,799,902 | 3/1974 | Anderson | 260/29.6 WB |
| 3,887,496 | 6/1975 | Cornier et al. | 260/29.6 WB |
| 4,092,287 | 5/1978 | Ito et al. | 260/29.6 WB |

*Primary Examiner*—Harold D. Anderson
*Attorney, Agent, or Firm*—Hubbell, Cohen, Stiefel & Gross

[57] ABSTRACT

An aqueous coating composition in the form of an aqueous dispersion of acrylic copolymer prepared by polymerizing a mixture of acrylic monomers in an aqueous medium containing an electroconductive copolymer. The composition forms coatings having both heat sealing properties and antistatic properties and also possessing transparency, anti-blocking properties, slipping properties and resistance to weather and to water.

8 Claims, No Drawings

AQUEOUS COATING COMPOSITIONS CONTAINING ELECTROCONDUCTIVE COPOLYMER

BACKGROUND OF THE INVENTION

1. Field of the Invention

The present invention relates to aqueous coating compositions, and more particularly to aqueous coating compositions in the form of an aqueous dispersion of acrylic copolymer prepared by polymerizing a mixture of acrylic monomers in an aqueous medium containing an electroconductive copolymer.

2. Description of the Prior Art

In recent years, various acrylic copolymer compositions have been proposed for coating plastics films (hereinafter referred to briefly as "films") with use of an aqueous medium to impart heat seal properties to the films as disclosed, for example, in U.S. Pat. No. 3,753,769 and Japanese Patent Publication No. 24223/1970. We have already invented coating compositions comprising an aqueous dispersion containing a specified acrylic copolymer for giving outstanding heat seal properties and filed a patent application therefor (Japanese Patent Application No. 73498/1976).

These coating compositions, which contain an aqueous medium, are usable free of the problem of residual solvent in the coatings formed from other known compositions containing an organic solvent. It is also known that the films coated with such coating compositions have transparency, stability against light and good heat seal properties and are useful as wrapping materials.

However, since the coated films have no anti-static properties, they become electrostatically charged easily when subjected to frictional contact with other articles, so that when used on an automatic machine for continuous packaging operation, the film is not smoothly automatically feedable, resulting in a seriously reduced efficiency. The surface of the film covering the wrapped or packaged articles is prone to dust deposition or staining, which greatly impairs the commercial value of the articles. To eliminate these problems due to electrostatic charges, it is desired to impart antistatic properties to the coated film.

In order to give films heat seal properties and antistatic properties, it is practiced to coat the film with a resin composition having heat seal properties and to apply an antistatic agent to the coating, but this method is not economical since it requires at least two coating steps. The method has another drawback that the film loses the antistatic properties when washed with water or subjected to friction because the antistatic agent is then easily removable. These drawbacks may be overcome by coating the film with a resin composition having heat seal properties and incorporating an antistatic agent. In fact, it has been attempted to practice this method with use of an electroconductive low-molecular-weight surfactant which is generally used as an antistatic agent so as to give the film heat seal properties and antistatic properties. However, the film, if given sufficient heat seal properties, fails to have high anti-static properties suited for recent high-speed packaging machines, whereas when given sufficient antistatic properties, the film is unable to have heat seal properties. Thus the method, unlike the present invention, involves difficulties in affording both heat seal properties and antistatic properties.

SUMMARY OF THE INVENTION

We have conducted intensive research in an attempt to provide coating compositions free of the above drawbacks and succeeded in developing aqueous coating compositions for forming coatings having heat seal properties and antistatic properties and also possessing transparency, anti-blocking properties, slipping properties and resistance to weather and water. The present invention provides such coating compositions.

Stated more specifically, this invention provides aqueous coating compositions capable of giving films improved heat seal properties and antistatic properties and comprising an aqueous dispersion containing a copolymer substantially in the form of particles, the copolymer having an average molecular weight of 5,000 to 150,000 and a glass transition temperature of 20° to 100° C., the copolymer comprising 0.5 to 20.0 parts by weight of a monomer component A composed of 100 to 25% by weight of at least one electroconductive vinyl monomer having a sulfonate or quaternary ammonium salt and 0 to 75% by weight of a vinyl monomer copolymerizable with the electroconductive vinyl monomer, and 100 parts by weight of a monomer component B composed of (a) 0 to 10% by weight of at least one of $\alpha,\beta$-unsaturated carboxylic acids having at least one carboxyl group and salts thereof, (b) 10 to 98% by weight of at least one of alkyl acrylates wherein the alkyl has 1 to 12 carbon atoms and alkyl methacrylates wherein the alkyl has 1 to 12 carbon atoms and (c) 0 to 80% by weight of at least one copolymerizable vinyl monomer, the copolymer being prepared by polymerizing the component A in an aqueous medium and polymerizing the component B in the resulting dispersion.

Antistatic properties are imparted to coating compositions usually with the use of an antistatic agent which is a low-molecular-weight surfactant having the drawback of impairing the heat seal properties of the composition, whereas the first feature of the present invention is that an electroconductive vinyl monomer is homopolymerized or copolymerized with a copolymerizable vinyl monomer into a high-molecular-weight polymer to overcome this drawback. The second feature of the invention is that the aqueous coating composition of the invention is substantially free from any emulsifier since the homopolymer or copolymer of the conductive vinyl monomer, which gives improved dispersion stability for dispersion polymerization, is used as a dispersion stabilizer for the preparation of the present composition. This eliminates the drawback that the use of an emulsifier results in coatings having reduced resistance to water and to weather and poor heat seal properties.

DESCRIPTION OF THE PREFERRED EMBODIMENT

Electroconductive vinyl monomers having a sulfonate or quaternary ammonium salt and useful in this invention are represented by the following formulas (I) to (III):

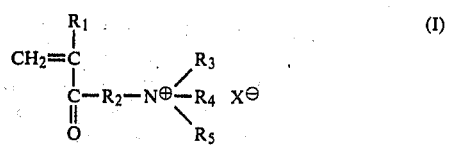

wherein:

$R_1$ is H or $CH_3$,
$R_2$ is $-OCH_2CH_2-$,

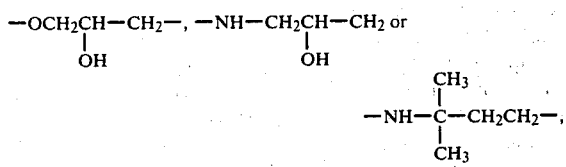

$R_3$ and $R_4$ are each $CH_3$ or $CH_2CH_3$,
$R_5$ is $C_nH_{2n+1}$ where n is 0 to 4,

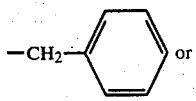

$CH_2CH_2CH_2SO_3^\ominus$, and
$X^\ominus$ is $Cl^\ominus$ or $Br^\ominus$, or is absent only when $R_5$ is $CH_2CH_2CH_2SO_3^\ominus$.

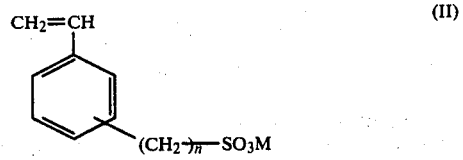

(II)

wherein:
n is 0 or 1, and
M is Li, Na, K or like alkali metal, or $NH_4$.

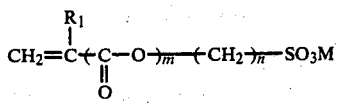

(III)

wherein:
m is 0 or 1,
n is 1 to 4,
$R_1$ is H or $CH_3$, and
M is Li, Na, K or like alkali metal, or $NH_4$.

Especially preferable among these monomers are 2-hydroxy-3-methacryloxypropyltrimethylammonium chloride included in the monomers of the formula (I) and sodium or ammonium salt of p-styrenesulfonic acid or sodium vinylbenzylsulfonate included in those of the formula (II).

According to this invention, the conductive vinyl monomer-containing component A must be used in an amount of 0.5 to 20.0 parts by weight, preferably 2.0 to 10.0 parts by weight, per 100 parts by weight of the component B. With less than 0.5 parts by weight of the component A present, antistatic properties will not be available, while amounts in excess of 20 parts by weight will increase the viscosity of the aqueous dispersion, rendering the polymerization system unstable or resulting in reduced anti-blocking properties, hence objectionable.

Vinyl monomers copolymerizable with the conductive vinyl monomers, although not particularly limited, are preferably of the same, or nearly the same, kinds as the monomers of the component B. This renders the conductive polymer more compatible with the component B, consequently affording a coating composition of improved heat seal properties and higher transparency. Additionally copolymerizable vinyl monomers capable of giving polymers of higher glass transition temperature will provide improved anti-blocking properties.

The proportion of the vinyl monomer to be copolymerized with the conductive vinyl monomer is 0 to 75% by weight, preferably 20 to 67% by weight, based on the component A. With at least 20% by weight of the former monomer present, the resulting copolymer will not be fully soluble in water, affording coatings of improved resistance to water and blocking. Proportions above 75% by weight give reduced antistatic properties and are not desirable.

Since the coating compositions of this invention can be prepared with the use of the homopolymer or copolymer of the conductive vinyl monomer as a dispersion stabilizer because the polymer imparts improved dispersion stability to the dispersion polymerization system, the present coating compositions do not contain any substantial amount of emulsifier, but usual emulsifiers or protective colloids may be used in a small quantity as auxiliary agents when so desired.

Examples of α,β-unsaturated carboxylic acids having at least one carboxyl group or salts thereof (a) useful for the component B of the invention are acrylic acid, methacrylic acid, maleic acid, itaconic acid, crotonic acid, fumaric acid and maleic anhydride or alkali metal salts or ammonium salts thereof. α,β-Unsaturated carboxylic acids having at least two carboxyl groups or salts thereof, when used, may be in the form of a half ester thereof. These carboxylic acids or salts thereof, mainly enabling the resulting coating to adhere to the film substrate more effectively, are used in a proportion of 0 to 10% by weight based on the component B. Above 10% by weight, the resulting coating will have reduced resistance to water, blocking and abrasion. When aqueous dispersions of acrylic copolymer are prepared with the use of cationic conductive vinyl monomers having a quaternary ammonium salt, such carboxylic acids or salts thereof impair the stability of the polymerization system. It is therefore preferable to avoid the use of these acids or salts.

Examples of useful alkyl acrylates or methacrylates (b) are those in which the alkyl is methyl, ethyl, isopropyl, n-butyl, i-butyl, amyl, n-hexyl, 2-ethylhexyl, lauryl or the like. The esters (b) are important ingredients which affect the flexibility and anti-blocking properties of the resulting coating and the glass transition temperature of the resulting polymer. Such alkyl esters are used in a suitable combination in view of the glass transition temperature, preferably in a proportion of 10 to 98% by weight based on the component B.

Although in no way limitative, examples of useful vinyl monomers (c) are:
(i) vinyl-substituted aromatic hydrocarbons such as styrene, α-methylstyrene, etc.
(ii) α,β-unsaturated aliphatic nitriles such as acrylonitrile, methacrylonitrile, etc.
(iii) vinyl esters of organic acids such as vinyl acetate, vinyl propionate, etc.
(iv) vinyl halides such as vinyl chloride, vinylidene chloride, etc.
(v) α,β-unsaturated carboxylic acid amides such as acrylamide, methacrylamide, N-methoxyacrylamide, etc.
(vi) hydroxyalkyl esters of α,β-unsaturated carboxylic acids such as 2-hydroxyethyl acrylate or methacrylate, 2-hydroxypropyl acrylate or methacrylate, etc.

(vii) α,β-unsaturated carboxylates having an epoxy group such as glycidyl acrylate or methacrylate, etc.

(viii) aminoalkyl esters of the α,β-unsaturated carboxylic acids such as dimethylaminoethyl acrylate or methacrylate, diethylaminoethyl acrylate or methacrylate, etc.

One or at least two of these copolymerizable vinyl monomers are used as described in a proportion of 0 to 80% by weight. These monomers appear to mainly affect the hardness and glass transition temperature of the coatings formed. The vinyl monomers (vi) and (vii) will permit the coating composition to adhere to films with improved effectiveness. The hydroxyalkyl esters of α,β-unsaturated carboxylic acids (vi), which are especially effective for this purpose, are used in a proportion of 0.1 to 30% by weight, preferably 5 to 30% by weight, based on the component B.

The desired acrylic copolymers of this invention have an average molecular weight of 5,000 to 150,000, preferably 8,000 to 80,000 and a glass transition temperature of 20° to 100° C., preferably 25° to 70° C. Copolymers having an average molecular weight of less than 5,000 fail to give satisfactory coatings with sufficient heat seal strength, whereas with an average molecular weight of more than 150,000, the resulting composition will not adhere to the film substrate effectively and no longer have sufficient viscosity to give satisfactory heat seal properties. The term "average molecular weight" as herein used refers to "number average molecular weight." With a glass transition temperature of lower than 20° C., the coatings obtained are tacky and subject to blocking, whereas if it is above 100° C., hard coatings will result with reduced flexibility and impaired heat seal properties.

The copolymers contained in the aqueous dispersions of this invention are substantially particulate. The expression "substantially particulate" means that the copolymer can be identified in the form of particles under an electron microscope. The copolymers are preferably about 0.01 to about 0.5 micron, most preferably 0.01 to 0.3 micron, in particle size. Good results are achievable when at least 90% of the particles contained in the dispersion have particle sizes in the above-mentioned range.

The aqueous coating compositions of this invention are prepared by the following process. First, 100 to 25% by weight of a conductive vinyl monomer having a sulfonate or quaternary ammonium salt and 0 to 75% by weight of a vinyl monomer copolymerizable therewith are polymerized in an aqueous medium to obtain 0.5 to 20.0 parts by weight of a component A relative to 100 parts by weight of a component B.

To render the polymerization system free from oxygen detrimental to the reaction, the air in the reactor is replaced by nitrogen gas. The polymerization is initiated under nitrogen stream with use of an initiator such as t-butyl hydroperoxide, 2,5-dimethyl-2,5-di(t-butylbenzyloxy)hexane or like organic peroxide, hydrogen peroxide, potassium persulfate, ammonium persulfate, a redox initiator comprising such a peroxide and a reducing agent, 2,2'-azobis(2-amidinopropane)-hydrochloride or like water-soluble azo compound.

The reaction temperature, the internal pressure of the reactor and the method of agitation are determined in accordance with the kind of the initiator and the kinds or combination of the monomers used. Preferably the reaction temperature is generally 20° to 85° C. when a redox initiator is used or 40° to 120° C. with the use of a peroxide or azo initiator.

The component B is then polymerized in the presence of the conductive polymer thus prepared with dropwise addition of an initiator. The initiator and the reaction temperature for this step may be, or need not always be, the same as in the preparation of the conductive polymer.

The aqueous dispersion obtained is stable as such. Preferably, however, ammonia, sodium hydroxide, potassium hydroxide, diethylamine, diethanolamine or the like may be added to the dispersion for pH adjustment. This affords improved stability. The aqueous coating composition may further incorporate a hot slip agent such as colloidal silica or talc, anti-blocking agent such as natural wax or fatty acid amide, plastisizer, anti-fogging agent, tackifier such as polyvinyl alcohol or carboxymethyl cellulose, stabilizer and the like when so desired.

The aqueous coating compositions of this invention are especially useful for coating plastics films such as polyethylene films, polypropylene films, polybutene films and like polyolefin films, polystyrene films, polyvinyl chloride films, polyamide films and polyester films which may be non-oriented, monoaxially oriented or biaxially oriented. The present compositions are most effective for coating biaxially oriented polypropylene films.

Preferably the film surfaces have a contact angle of up to 85 degrees relative to water. Although polyamide films and polyester films are directly coatable, polystyrene films and polyolefin films may preferably be activated over their surfaces before coating as by corona discharge or with an oxidizing agent.

The aqueous coating compositions of this invention are applicable to films by various methods as by an applicator such as roll coater, dip coater or gravure coater and are thereafter dried. Good results are attainable with coatings of such thickness that about 0.3 to about 5 g of the composition calculated as solids is applied per square meter of the film surface. The coated films are used as such for wrapping or made into bags for packaging various articles. They are well suited for wrapping tobacco, caramels, chocolates, etc. by a high-speed automatic packaging machine of the overlap type.

The aqueous coating compositions of this invention are useful also for various other applications in which their characteristics such as antistatic properties (conductive properties), transparency and abrasion resistance are useful. The amount of the composition to be applied to the film substrate is suitably determined in accordance with the particular use intended. The present compositions are usable, for example, for masking films, lith films and like materials for photomechanical processes, for preventing dust deposition and electrostatic charging of copying materials such as photoconductive polyester composite films, and as electroconductive materials for electrostatic copying sheets.

The present compositions are usable not only for the plastics films described but also for coating aluminum or other metal foils, papers including printing paper and photosensitive paper, plastics sheets and moldings and natural or synthetic leathers and for treating fibers and fibrics.

The present compositions find other special uses for laminating paper sheets and plastics films, for coating interior wall surfaces of greenhouses made of polyvinyl chloride or like sheets to prevent deposition of water droplets thereon and for coating floor materials as waxes.

The present invention will be described below in greater detail with reference to examples, in which the coated films were tested for properties by the following methods.

Antistatic properties:

The film was tested on a static honestometer, Type S-4104 (product of Shishido Co., Ltd., Japan) with application of voltage at 10 KV. Charge potential and half-period of escape of the electrostatic charge were measured at 20° C. 65% RH.

Heat seal strength:

Two films were heat-sealed with their coated surfaces fitting to each other by a bar-type heat sealer at 90°, 100° or 110° C. at pressure of 1 kg/cm² for 1 second, then allowed to stand for 24 hours in an atmosphere at 20° C., 65% RH and thereafter separated by a tensile tester at a rate of 100 mm/min to determine the force required for the separation.

Coefficient of friction:

A metal plate, 65 mm×61.5 mm, having a piece of film affixed thereto was pulled on a fixed piece of the same film at a speed of 150 mm/min with the coated surfaces opposed to each other to determine the kinetic friction coefficient and static friction coefficient involved.

Anti-blocking properties:

Several pieces of film, 50 mm×50 mm, were placed between two sheets of glass, allowed to stand in an atmosphere at 40° C., 80% RH under a load of 0.5 kg/cm² for 48 hours and thereafter allowed to cool to room temperature. The anti-blocking properties of the film were evaluated as being "excellent" if the film pieces were individually separable without application of any force, or as "good" if they were individually separable with application of a small force.

Transparency:

Determined with the unaided eye.

Surface resistivity and volume resistivity:

The coated film was conditioned in an atmosphere at 20° C., 65% RH and thereafter tested with the use of a teraohmmeter, Model VE-30 and roomtemperature resistivity chamber, Model P-601 (products of Kawaguchi Electric Works Co., Ltd., Japan).

The surface resistivity is given by $\sigma = 18.7 \times Rs$ ($\Omega$) wherein Rs is the surface resistivity ($\Omega$) measured by Model P-601.

The volume resistivity is given by $\rho = (19.62/t) \times Rv$ ($\Omega \cdot cm$) wherein Rv is the volume resistivity ($\Omega$) measured by Model P-601, and t is the thickness (cm) of the specimen.

EXAMPLE 1

A 961 g quantity of deionized water, the component A given below and 0.1 g of t-dodecylmercaptan serving as a molecular weight modifier were placed into a four-necked 2-liter separable flask equipped with a reflux condenser, thermometer, stirrer and dropping funnels. The system was heated to 85° C. with stirring while introducing nitrogen gas into the flask, a 18.2 g portion of the aqueous solution of polymerization initiator given below was placed into the flask, and the monomers were polymerized at 85° C. for 20 minutes.

Subsequently a uniform mixture of the component B given below and 4.4 g of t-dodecylmercaptan serving as a molecular weight modifier, and the remaining 164.05 g portion of the polymerization initiator solution were added dropwise to the reaction mixture at the same through separate dropping funnels over a period of 2 hours. After the completion of the dropwise addition, the component B was further polymerized at 85° C. for 2 hours. The resulting mixture was thereafter cooled.

| Component A | | |
|---|---|---|
| Conductive vinyl monomer: | | |
| 2-Hydroxy-3-methacryloxypropyl-trimethylammonium chloride | | 27 g |
| Copolymerizable vinyl monomers: | | |
| 2-Hydroxyethyl methacrylate | 15% by weight | |
| Methyl methacrylate | 27% by weight | 10 g |
| Styrene | 27% by weight | |
| Ethyl acrylate | 31% by weight | |
| Aqueous solution of polymerization initiator | | |
| Polymerization initiator: | | |
| 2,2'-Azobis(2-amidinopropane)hydrochloride | | 2.25 g |
| Deionized water | | 180 g |
| Component B | | |
| Uniform mixture of the same composition as the mixture of copolymerizable vinyl monomers of the component A | | 440 g |

The above process gave a cationic aqueous dispersion containing an acrylic copolymer 12,000 in average molecular weight and 46° C. in glass transition temperature and having a solid content of 30%, pH of 3.8 and viscosity of 13 cp/30° C.

To the dispersion were added 4.5 parts by weight of natural wax, 0.3 part by weight of silica and 0.03 part by weight of finely divided silica per 100 parts by weight of the solids of the dispersion, and the resulting dispersion was adjusted to a solid concentration of 20% with addition of deionized water. The dispersion was applied by Mayer Bar (R.D. Specialties laboratory coating rod, U.S.A.) No. 5 to a 20-micron-thick biaxially oriented polypropylene film treated by corona discharge and then dried in hot air at 110° C. for 2 minutes. The amount of the resulting coating was 1.2 g/m². The coated film was tested for properties with the results listed in Table 1.

EXAMPLE 2

The same polymerization procedure as in Example 1 was repeated except that sodium p-styrenesulfonate was used in the place of 2-hydroxy-3-methacryloxypropyltrimethylammonium chloride serving as the conductive vinyl monomer in Example 1, that 2-hydroxyethyl methacrylate, methyl methacrylate, styrene, ethyl acrylate and acrylic acid were used in proportions by weight of 15:26:26:31:2 as the copolymerizable vinyl monomers of the component A and also as the ingredients of the component B and that 2,2'-azobis(2-amidinopropane)-hydrochloride, polymerization initiator, was replaced by potassium persulfate. According to the same formulation as in Example 1, wax and finely divided silica were added to the resulting reaction mixture, and the solid concentration of the mixture was further adjusted. The dispersion thus prepared was applied to a biaxially oriented polypropylene film. The coated film was tested for properties with the results listed in Table 1.

EXAMPLES 3 TO 9

Table 1 shows the conductive vinyl monomer and copolymerizable vinyl monomers of the component A used along with the quantities thereof, the composition of the component B and the quantity of t-dodecylmercaptan which was used for the copolymerizable vinyl monomers of the component A and for the component B separately as divided in proportion to the combined quantity of the monomers and the quantity of the component B. The same polymerization procedure as in Example 2 was repeated with use of these ingredients to obtain an aqueous dispersion of acrylic copolymer.

According to the same formation as in Example 1, wax and finely divided silica were added to the dispersion, and the solid concentration of the mixture was adjusted. The resulting dispersion was applied to a biaxially oriented polypropylene film. Table 1 also shows the properties of the coated film determined.

sion, and the solid concentration of the mixture was adjusted. The resulting dispersion was applied to a 30-micron-thick polyester film with Mayer Bar No. 12 and dried in hot air at 110° C. for 2 minutes. The amount of the coating formed was 2.6 g/m². The coated film had a surface resistivity of $2.00 \times 10^{10}$ ohms and was satisfactory in antistatic properties, resistance to blocking and slip properties.

EXAMPLE 11

The aqueous dispersion of acrylic copolymer obtained in Example 10 was applied to a 25-micron-thick matted polyester film with Mayer Bar No. 12 and dried

TABLE 1

| | Component A | | | | | | | | | | | | |
|---|---|---|---|---|---|---|---|---|---|---|---|---|---|
| | Conductive vinyl monomer | Copolymerizable vinyl monomers*1 | Component B Composition (wt. %) | | | | | | | TDM*1 | | TG | $\frac{A}{B} \times 100$ |
| Example | (wt. %) | (wt. %) | HEMA | St | MMA | MA | EA | BA | AA | (wt. %) | $\overline{Mn}$ | (°C.) | (wt. %) |
| 1 | MHPTAC 71.4 | 28.6 | 15 | 27 | 27 | | 31 | | | 1 | 12,000 | 47 | 8.6 |
| 2 | NaSS 71.4 | 28.6 | 15 | 26 | 26 | | 31 | | 2 | 1 | 15,000 | 44 | 8.6 |
| 3 | NaSS 66.7 | 33.3 | 15 | 52 | | | | 31 | 2 | 0.33 | 32,000 | 27 | 16.6 |
| 4 | NaSS 100.0 | 0 | 15 | 55 | | | | 28 | 2 | 0.6 | 24,000 | 33 | 4.0 |
| 5 | NH4SS 55.6 | 44.4 | 15 | 52 | | 31 | | | 2 | 1.33 | 16,000 | 59 | 9.4 |
| 6 | NH4SS 45.5 | 54.5 | 15 | | 55 | | | 28 | 2 | 1 | 25,000 | 50 | 11.7 |
| 7 | NH4SS 71.4 | 28.6 | 15 | | 42 | | | 41 | 2 | 1 | 21,000 | 34 | 2.8 |
| 8 | NaVBS 71.4 | 28.6 | 15 | 21 | 21 | | | 41 | 2 | 0.8 | 20,000 | 33 | 13.1 |
| 9 | NaVBS 71.4 | 28.6 | 15 | | 34 | | | 49 | 2 | 0 | 59,000 | 24 | 8.6 |

| | Properties of coating film | | | | | | | | |
|---|---|---|---|---|---|---|---|---|---|
| | Antistatic properties | | Heat seal strength (g/15 mm) | | | Coefficient of friction | | | |
| | Charge | Half period | | | | | | Anti-blocking | |
| Example | (mV) | (sec) | 90° C. | 100° C. | 110° C. | Static | Kinetic | properties | Transparency |
| 1 | 6.0 | 3.0 | 80 | 140 | 150 | 0.24 | 0.23 | Good | High |
| 2 | 1.0 | 1.5 | 118 | 124 | 125 | 0.28 | 0.22 | Excellent | High |
| 3 | 4.5 | 3.0 | 140 | 143 | 140 | 0.25 | 0.20 | Excellent | High |
| 4 | 22.5 | 18.0 | 130 | 124 | 123 | 0.22 | 0.21 | Excellent | High |
| 5 | 0 | 0 | 103 | 111 | 103 | 0.31 | 0.27 | Good | High |
| 6 | 0 | 0 | 114 | 129 | 111 | 0.32 | 0.26 | Good | High |
| 7 | 3.0 | 0.8 | 108 | 130 | 129 | 0.33 | 0.24 | Good | High |
| 8 | 8.2 | 3.2 | 91 | 102 | 80 | 0.24 | 0.20 | Good | High |
| 9 | 29.7 | 21.6 | 104 | 99 | 94 | 0.36 | 0.32 | Good | High |

Note: (The same as in Table 2 to follow.)
*1 The mixture of the copolymerizable vinyl monomers has the same composition as the component B.
*2 The quantity based on the copolymerizable vinyl monomers of the component A plus the component B.
The abbreviations stand for:
MHPTAC:2-hydroxy-3-methacryloxypropyltrimethylammonium chloride
NaSS:sodium p-styrenesulfonate
NH4SS:ammonium p-styrenesulfonate
NaVBS:sodium vinylbenzylsulfonate
TDM:t-dodecylmercaptan
HEMA:2-hydroxyethyl methacrylate
St:styrene
MMA:methyl methacrylate
MA:methyl acrylate
EA:ethyl acrylate
BA:butyl acrylate
AA:acrylic acid
Mn:average molecular weight
Tg:glass transition temperature

EXAMPLE 10

Table 2 shows the conductive vinyl monomer and copolymerizable vinyl monomers of the component A used and the quantities thereof, the composition of the component B and the quantity of t-dodecylmercaptan which was used for the copolymerizable vinyl monomers of the component A and for the component B separately as divided in proportion to the combined quantity of the monomers and the quantity of the component B. The same polymerization procedure as in Example 2 was repeated with the use of these ingredients to obtain an aqueous dispersion of acrylic copolymer.

According to the same formulation as in Example 1, wax and finely divided silica were added to the dispersion, and finely divided silica were added to the dispersion in hot air at 110° C. for 2 minutes. The amount of the coating formed was 3.65 g/m². The coated film had a surface resistivity of $6.55 \times 10^9$ ohms and was found outstanding in antistatic properties and resistance to blocking and to abrasion.

EXAMPLE 12

Table 2 shows the conductive vinyl monomer and copolymerizable vinyl monomers of the component A used and the quantities thereof, the composition of the component B used and the quantity of t-dodecylmercaptan which was used for the copolymerizable vinyl monomers of the component A and for the component B separately as divided in proportion to the combined quantity of the monomers and the quantity of the component B. The same polymerization procedure as in Example 2 was repeated with the use of these ingredients to obtain an aqueous dispersion of acrylic copolymer. The dispersion was applied to an aluminum foil with Mayer Bar No. 30 and then dried in hot air at 110° for three minutes. This coating procedure was repeated five times to form a 58-micron-thick coating, which was found to have a volume resistivity of $6.25 \times 10^{10}$ ohms. The coated foil had outstanding conductivity.

EXAMPLE 13

An aqueous dispersion of acrylic copolymer was prepared in the same manner as in Example 12 except that the same compounds were used in the quantities listed in Table 2.

According to the same formulation as in Example 1, wax and finely divided silica were added to the dispersion, and the solid concentration of the mixture was adjusted. The resulting dispersion was applied to a sheet of art paper with Mayer Bar No. 12 and then dried at 110° C. for 2 minutes. The coated paper had a surface resistivity of $1.58 \times 10^{10}$ ohms and was found outstanding in antistatic properties, slipping properties and antiblocking properties and satisfactorily handleable. The paper also had high surface gloss.

EXAMPLE 14

An aqueous dispersion of acrylic copolymer was prepared in the same manner as in Example 12 except that the same compounds were used in the quantities listed in Table 2. The dispersion was applied to a cardboard (0.43 mm in thickness) with Mayer Bar No. 30 and then dried at 110° C. for 2 minutes in hot air. A biaxially oriented polypropylene film was fitted over the coated cardboard with the coated surface in contact with one side of the film treated by corona discharge. (The treated surface of the film may, or need not, be coated with the dispersion). The assembly was roll-pressed in a dry state at nip pressure of 20 kg/cm, roll temperature of 80° C. and roll speed of 7.5 m/min to obtain a laminate, which was tested for separation. The laminate had such high bond strength that the cardboard was broken before separation.

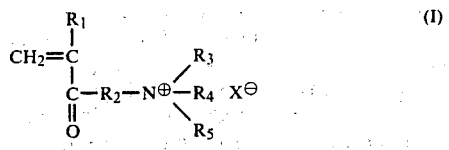

wherein
$R_1$ is hydrogen or methyl; $R_2$ is $-OCH_2CH_2-$,

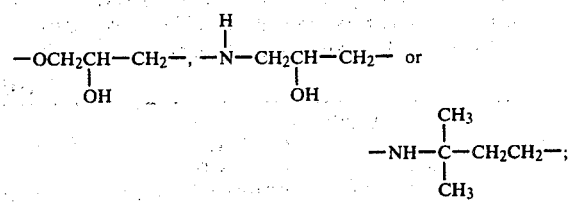

and $R_4$ are each methyl or ethyl; $R_5$ is $C_nH_{2n+1}$ where n is zero or an integer of 1 to 4,

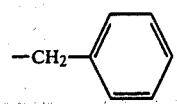

or $CH_2CH_2CH_2SO_3^\ominus$; and $X^\ominus$ is $Cl^\ominus$ or $Br^\ominus$, or is absent when $R_5$ is $CH_2CH_2CH_2SO_3^\ominus$;
a compound represented by Formula II:

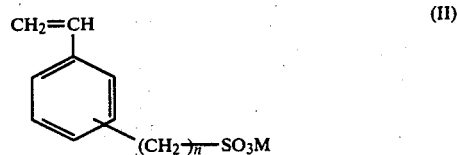

wherein n is 0 or 1, and M is an alkali metal or $NH_4$, and a compound represented by Formula III:

(III)

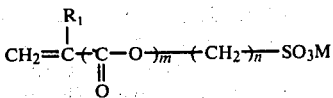

wherein m is 0 or 1, n is an integer of 1 to 4, $R_1$ is hydrogen or methyl, and M is an alkali metal or $NH_4$ and (2) 0 to 75% by weight of a vinyl monomer copolymerizable with the electroconductive vinyl monomer; and wherein component B is a polymer of (a) 0 to 10 by weight of at least one of $\alpha,\beta$-unsaturated carboxylic acid and salts thereof, (b) 10-98% by weight of at least one of alkyl acrylates wherein the alkyl has 1 to 12 carbon atoms and

TABLE 2

| | Component A | | | | | | | | | | |
|---|---|---|---|---|---|---|---|---|---|---|---|
| | Conductive vinyl monomer | Copolymerizable vinyl monomers | Component B Composition (wt. %) | | | | | TDM | $\overline{Mn}$ | TG | $\frac{A}{B} \times 100$ |
| Example | (wt. %) | (wt. %) | HEMA | St | MMA | EA | AA | (wt. %) | | (°C.) | (wt. %) |
| 10 | NaSS 66.7 | 33.3 | 15 | 26 | 26 | 31 | 2 | 1 | 17,000 | 47 | 5.7 |
| 12 | NaSS 66.7 | 33.3 | 15 | 16 | 16 | 51 | 2 | 1 | 18,000 | 25 | 13.1 |
| 13 | NaSS 66.7 | 33.3 | 15 | 26 | 26 | 31 | 2 | 1 | 17,000 | 48 | 8.6 |
| 14 | NaSS 66.7 | 33.3 | 15 | 16 | 16 | 51 | 2 | 1 | 16,000 | 23 | 8.6 |

What is claimed is:

1. An aqueous coating composition comprising an aqueous dispersion containing a copolymer substantially in the form of particles and having a glass transition temperature of 20° to 100° C., the copolymer comprising 0.5 to 20.0 parts by weight of component A and 100 parts by weight of component B, wherein component A is a polymer of (1) 100 to 25% by weight of at least one electroconductive vinyl monomer selected from the group consisting of a compound represented by Formula I:

alkyl methacrylates wherein the alkyl has 1 to 20 carbon atoms and (c) 0.1 to 80% by weight of at least one copolymerizable vinyl monomer, wherein 0.1 to 30% by weight of said copolymerizable vinyl monomer is a hydroxyalkyl ester of $\alpha,\beta$-unsaturated carboxylic acid and any remaining copolymerizable vinyl monomers are selected from the group consisting of a vinyl-substituted aromatic hydrocarbon, $\alpha,\beta$-unsaturated aliphatic nitrile, vinyl ester of organic acid, vinyl halid, $\alpha,\beta$-unsaturated carboxylic acid amide, $\alpha,\beta$-unsaturated carboxylate having an epoxy group and aminoalkyl ester of $\alpha,\beta$-unsaturated carboxylic acid; the copolymer being prepared by polymerizing said component A monomers in an aqueous medium to form an aqueous dispersion of component A and polymerizing said component B monomers in the resulting dispersion of component A.

2. A composition as defined in claim, 1 wherein the electroconductive vinyl monomer is a compound represented by the formula (I):

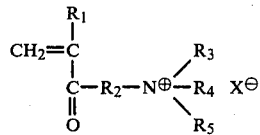
(I)

wherein $R_1$ is hydrogen or methyl; $R_2$ is —OCH$_2$CH$_2$—,

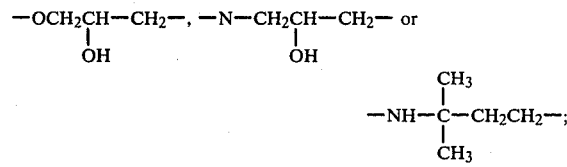

$R_3$ and $R_4$ are each methyl or ethyl; $R_5$ is $C_nH_{2n+1}$ where n is zero or an integer of 1 to 4,

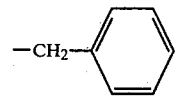

or $CH_2CH_2CH_2SO_3^{\ominus}$; and $X^{\ominus}$ is $Cl^{\ominus}$ or $Br^{\ominus}$, or is absent when $R_5$ is $CH_2CH_2CH_2SO_3^{\ominus}$.

3. A composition as defined in claim 1 wherein the electroconductive vinyl monomer is a compound represented by the formula (II):

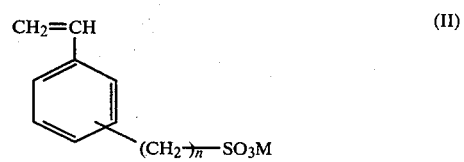
(II)

4. A composition as defined in claim 1 wherein the electroconductive vinyl monomer is 2-hydroxy-3-methacryloxypropyltrimethylammonium chloride, sodium salt or ammonium salt of p-styrenesulfonic acid or sodium vinylbenzylsulfonate.

5. A composition as defined in claim 1 wherein 2.0 to 10 parts by weight of the component A is used per 100 parts by weight of the component B.

6. A composition as defined in claim 1, wherein component A is a polymer of 80 to 33% by weight of at least one electroconductive vinyl monomer and 20 to 67% by weight of a vinyl monomer copolymerizable therewith.

7. A composition as defined in claim 1 wherein the copolymer has a glass transition temperature of 25° to 70° C.

8. A composition as defined in claim 1 wherein the copolymer is 0.01 to 0.5 micron in particle size.

* * * * *